INVENTOR.
NIELS A. CHRISTENSEN
BY Bates, Teare, & McBean
ATTORNEYS

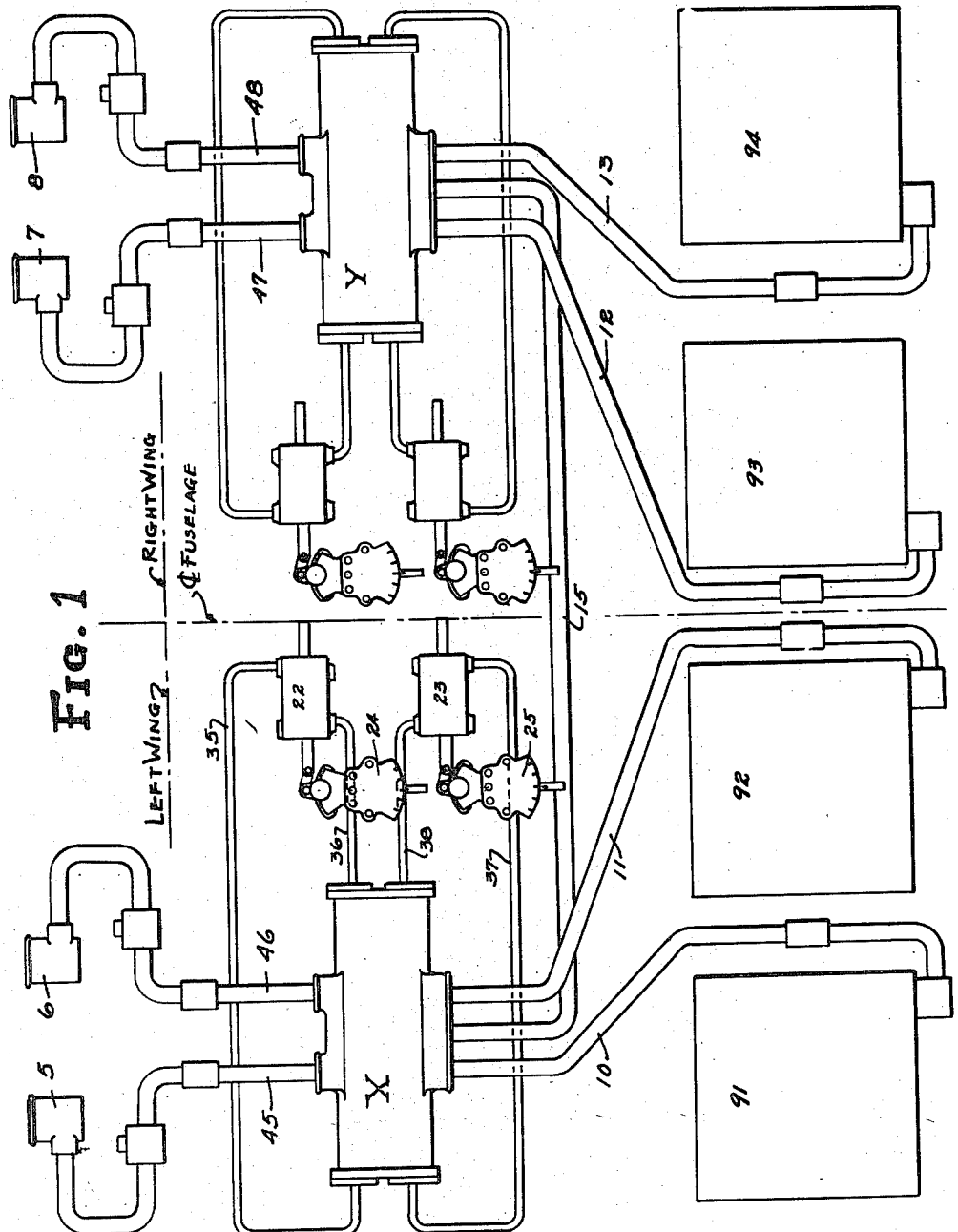

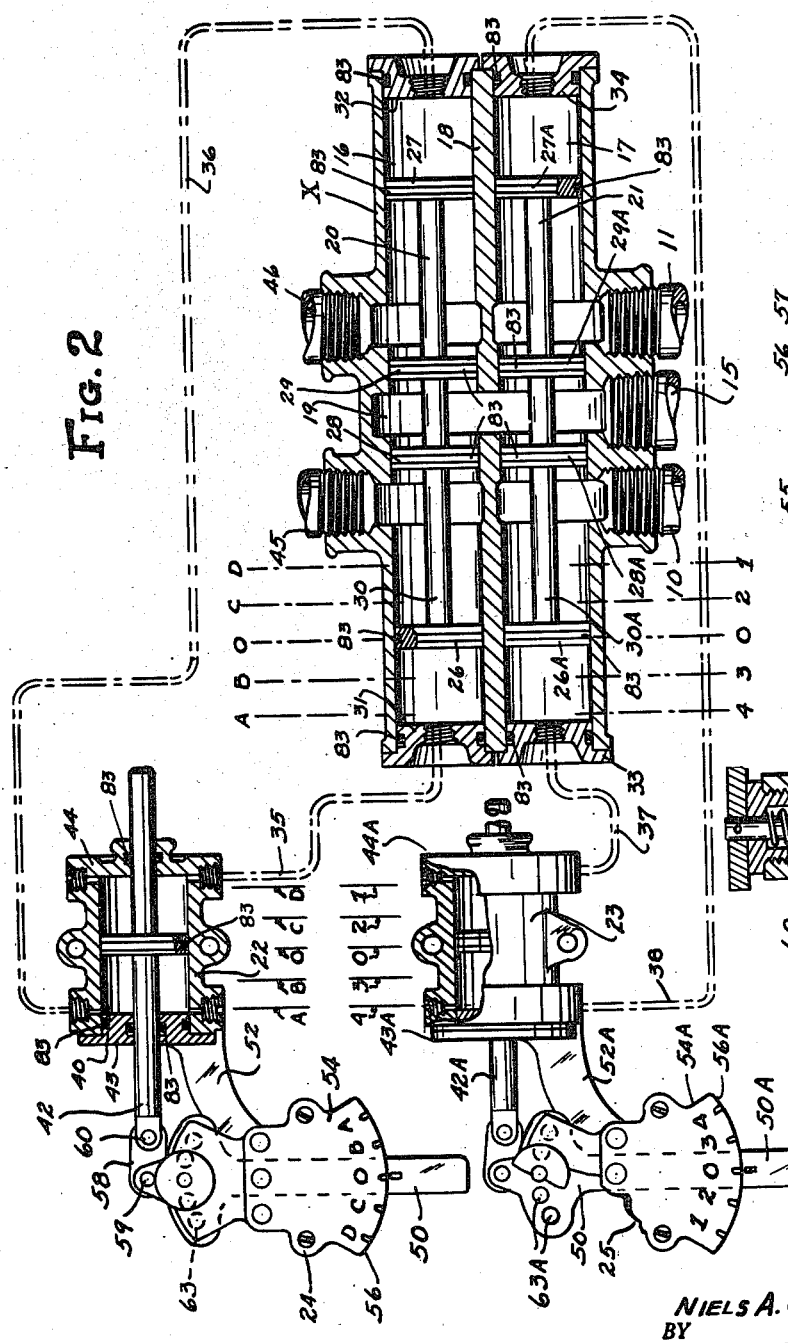
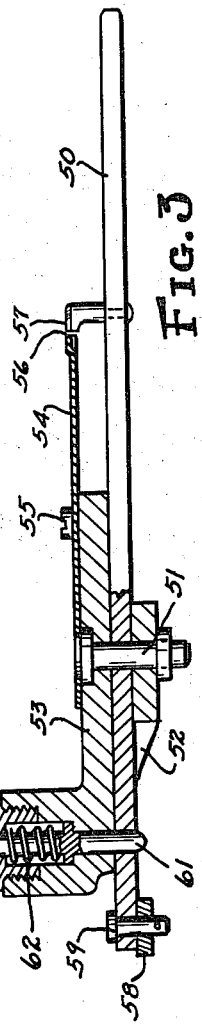
INVENTOR.
NIELS A. CHRISTENSEN
BY
Bates, Teare, & McBean
ATTORNEYS

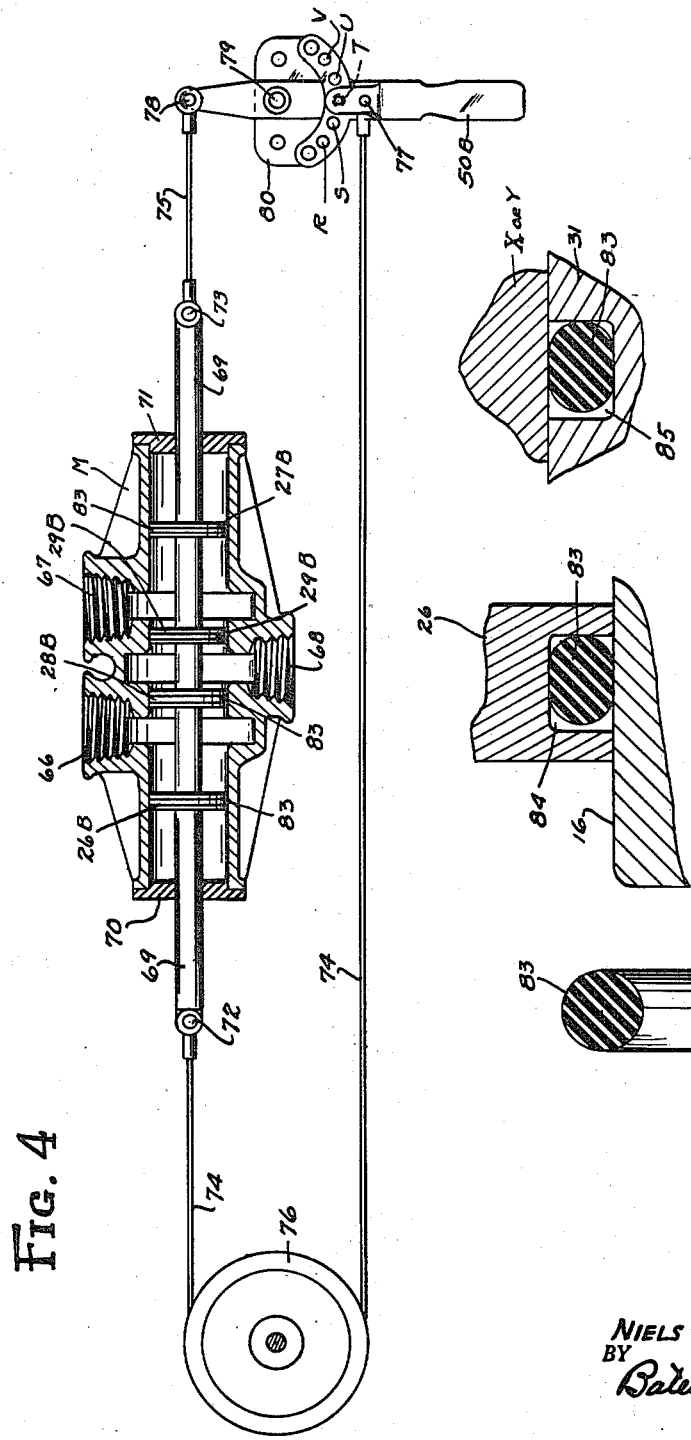

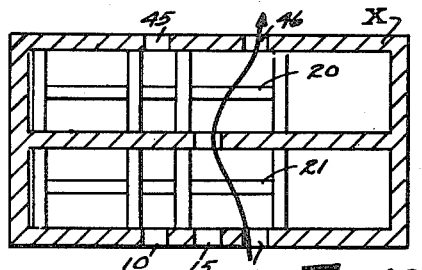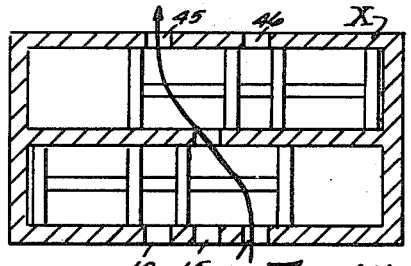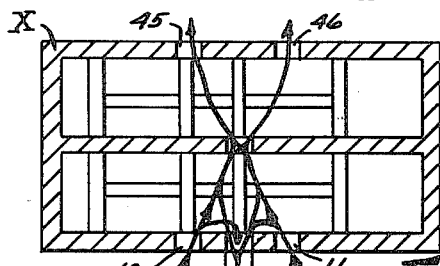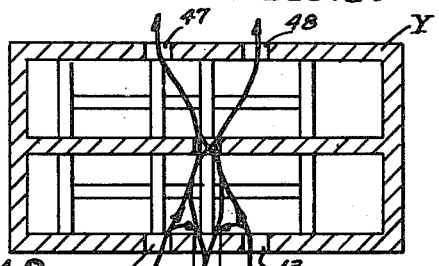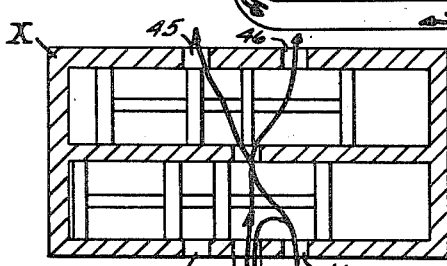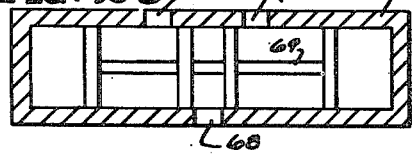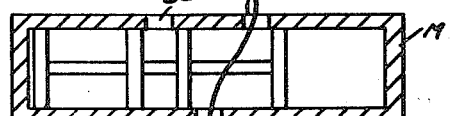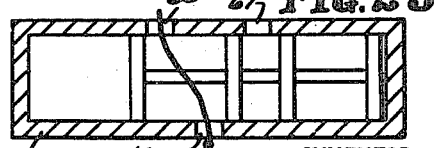

Patented Jan. 21, 1947

2,414,451

UNITED STATES PATENT OFFICE 2,414,451

FLUID CONTROL SYSTEM

Niels A. Christensen, South Euclid, Ohio

Application July 27, 1943, Serial No. 496,336

5 Claims. (Cl. 158—36)

This invention relates to a system and apparatus for selectively controlling the flow of liquid from a plurality of sources into a plurality of devices that normally use liquid in the operation thereof, such for example as a multi-motored airplane.

In modern airplane design it is customary to use a plurality of tanks for one or more motors, and to draw fuel from the tanks progressively as it is consumed on an extensive flight. In combat work, however, where the liability is present of sudden damage to one or more engines, or to one or more fuel supply tanks, there is a great need for a system by means of which fuel may be supplied by any individual or combination of tanks and delivered to any individual or combination of engines. At the present time the fuel tanks are usually located at a point quite remote from the operator, and due to various reasons, the valves controlling the flow of fuel are located at points remote from the pilot, wherefore, dependence must be placed upon other members of the crew to operate the valves in case of emergency. An additional problem in such work has been the difficulty of maintaining a satisfactory leakproof joint at the valve, so as to minimize the danger of leakage into the fuselage.

The present invention has for its primary object the provision of a system of fuel control wherein the operating members can be positioned within reach of the pilot, and wherein the system will operate to provide selective supply from any tank or combination of tanks for dispensing fuel to any individual engine or combination of engines, thereby affording instantaneous control independently of other members of the crew, and permitting immediate disconnection of any engine, or source of fuel supply, in the event of an emergency. Additionally, the invention contemplates an arrangement whereby the source of supply to any engine may be instantaneously altered without interfering with the flow of fuel to the remaining engines.

An additional object of the invention is to make an apparatus which will permit the selective control desired aforesaid, without permitting leakage of fuel.

Another object of the invention is to provide an apparatus which will assure positive operation of the control mechanism, and in which the principal parts are interchangeable for single or multiple motor operation.

Figure 8:
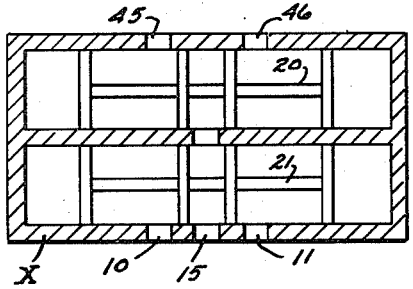
Figure 12:
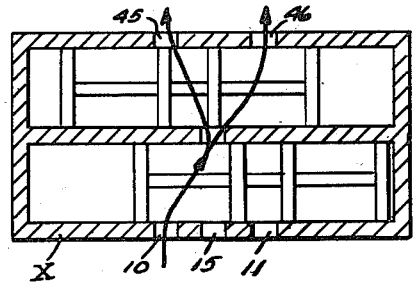
Figure 9:
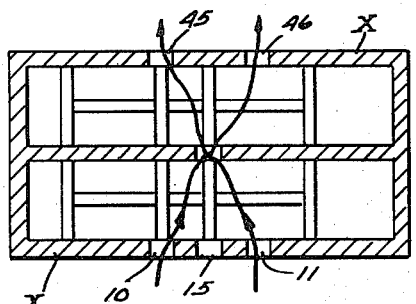
Figure 13:
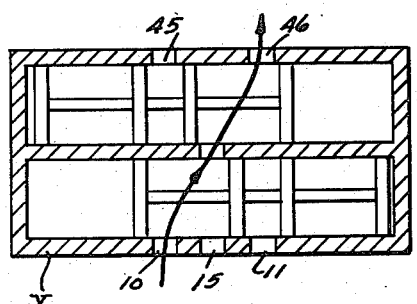
Figure 10:
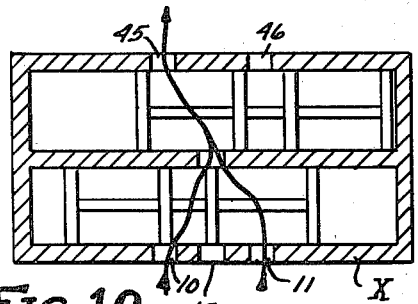
Figure 14:
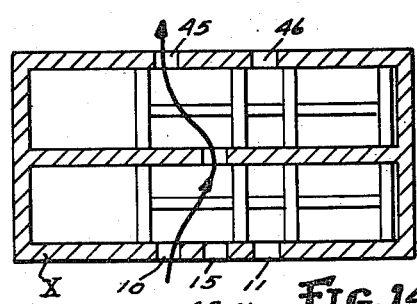
Figure 11:
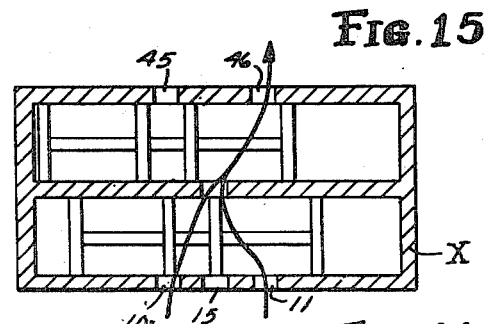
Figure 15:
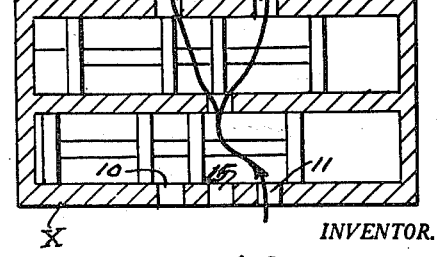

Referring now to the drawings, Fig. 1 is a diagrammatic view illustrating a typical layout for selectively controlling the flow of fluid to a four-motored airplane, where four supply tanks are utilized for containing the fuel; Fig. 2 is an assembly diagram partly in section and illustrating some of the features of the control equipment in greater detail than is shown in Fig. 1; Fig. 3 is a section taken through part of the selective control equipment; Fig. 4 is an assembly illustration showing part of the control equipment in section adapted for use as a modified arrangement of operating the control valve; Fig. 5 is a section taken on a scale larger than that shown in Fig. 4 and illustrating the sealing ring used in the control equipment; Fig. 6 is a section showing the use of the sealing member of Fig. 5; Fig. 7 is a sectional view illustrating the use of the sealing member of Fig. 5 as a packing for the end wall of a control cylinder; Figs. 8 to 19 are diagrammatic views illustrating different positions of the control valves for the purpose of illustrating the flow of fuel from different tanks to different engines; Figs. 20 to 23 are diagrammatic views illustrating the positions of the valves for operating an airplane having a single engine from a plurality of fuel supply sources.

In Fig. 1, the sources of fuel supply are designated by tanks 91, 92, 93, and 94, respectively, while the devices which utilize the liquid contained in the tanks are indicated as engines 5, 6, 7, and 8, respectively. Between the tanks and the engines, I provide selector chambers with valve mechanism which permits the operation of any engine from any tank, by means of control devices that can be readily installed within reach of the pilot and quickly operated to select any individual tank or engine, or combination of tanks and engines.

For a four-motored system, I have shown selector units designated "X" and "Y," respectively, which are identical in construction; unit "X" operating to direct the flow of fuel to engines 5 and 6, and unit "Y" operating to direct the flow of fuel to engines 7 and 8, respectively. Each unit is shown as having conduits leading therefrom directly to some of the tanks, and indirectly through the other unit to the remaining tanks. Thus, for example, unit "X" has conduits 10 and 11, connecting it directly with tanks 91 and 92, respectively, while unit "Y" has conduits 12 and 13 connecting it to tanks 93 and 94, respectively. A conduit 15 connects the units "X" and "Y" and operates as an inter-communicating passageway for permitting either unit to draw fuel from the tanks that are directly connected to the other units.

The interior construction of a selector unit may be observed by reference to Fig. 2, wherein the unit "X" is shown as comprising two cylinders 16 and 17 which are separated by a partition 18. The two cylinders are preferably formed in a single housing that has a centrally located recess 19 which provides communication between the cylinders, and is of larger cross sectional area than that of the combined cylinders. The purpose of the central recess is to form a fluid receiving chamber that is adapted to be put into communication with the respective sources of supply and engines, in accordance with the movements of the valve members 20 and 21 in the cylinders 16 and 17, respectively, as will hereinafter be set forth. The valve members are under the control of an operator who can actuate one member independently of the other and thereby effect a combination of settings that will give the desired range of control. Thus, for example, the valve member 20 is governed by the operation of a pilot mechanism, indicated in general at 22, while the valve member 21 is governed by the position of a pilot mechanism 23, and the respective pilot mechanisms are in turn governed by the operation of selector devices 24 and 25, respectively.

Each valve member 20 or 21 may have end pistons 26 and 27, and intermediate pistons 28 and 29, respectively. All pistons are rigidly mounted upon an axially extending rod 30, and each piston has a sealing device at its periphery, shown in Figs. 5 and 6, which prevents the escape of liquid past the piston whenever the piston is in contact with the associated cylinder wall. The same reference characters used for designating the parts of the valve member 20 are employed for like parts on the valve member 21, but with the suffix "A."

As will be observed from Fig. 2, the end of the rod 30 terminates at the respective pistons 26 and 27; hence, to move the pistons in their respective cylinders, provision is made for introducing a liquid against the outer end thereof; the arrangement being such that as liquid is withdrawn from the space on the outer side of the piston 26, a corresponding amount is added to the space adjacent the outer side of the piston 27. Accordingly, to permit such piston movement, the ends of the cylinders 16 and 17 are closed by plugs 31 and 32 on the cylinder 16 and by plugs 33 and 34 on the cylinder 17, respectively. These plugs form the end cylinder walls and each has a passageway therethrough in communication with a conduit leading to one of the pilot valves 22 or 23. Thus, for example, the ends of cylinder 16 are connected through conduits 35 and 36, respectively, to the pilot 22, while the ends of cylinder 17 are connected by conduits 37 and 38, respectively to the pilot 23.

Each pilot embodies a cylinder 40 having a piston 41 movable therein, and the piston in turn is mounted on a rod 42 which extends through the walls 43 and 44 and is adapted to be manually reciprocated by the equipment heretofore designated as 24 and 25, respectively. Since the pilot 23 is similar to that indicated at 22, the parts thereof which correspond are indicated by the same reference characters, but with the suffix "A."

The cylindrical space on each side of the piston 41, as well as the conduits which connect the pilot to the cylinder of unit "X," together with the space between the outer faces of the pistons 26 and 27 and their respective cylinder walls 31 and 32, are completely filled with a non-compressible fluid, such as oil. Thus, whenever the piston 41 is moved within its cylinder, the volume displaced on one side thereof corresponds exactly to the volume forced in on the other side thereof through the movement of the valve member in the cylinder of unit "X." Accordingly, any desired position of the valve member 20 can be obtained by moving the piston 41 to a predetermined position and the position of that piston can be ascertained by means of an indicator disposed on the control member 24.

Referring back to Fig. 1, the unit "X" is connected to the engines 5 and 6 through conduits 45 and 46, respectively, while the unit "Y" is connected to the engines 7 and 8 by conduits 47 and 48, respectively. In practice, the units "X" and "Y" can be located in a most direct path between the respective tanks and engines, while the pilot valves which control operation of the units "X" and "Y" can be located remotely from the tanks and engines, but in close proximity to the operator of the aircraft. The invention thus is extremely flexible for installation in any kind of an airplane, or in any kind of a vehicle in which the system is to be utilized.

The mechanism shown in Fig. 2 for operating each pilot valve may comprise a handle 50 which is pivoted at 51 to a bracket 52. The bracket may be fastened to a housing for the pilot valve 22, or to any rigid part of the structure on which the pilot valve is mounted. In Fig. 3, a face plate 53, which is also rigid with the bracket 52, is shown as having an indicator plate 54 mounted thereon, as by securing members 55. The face plate 54 terminates in an arcuate plate 56 which is concentric with the pivot 51 and which has suitable station positions indicated thereon. Thus, for pilot 22, the stations are indicated at D, C, O, B, and A, which are predetermined to suit desired positions of the valve member 20 in the cylinder 16. A pointer 57 on the handle 50 indicates the various stations as the handle is swung on its pivot, and such movement is transmitted to the piston rod 42 by means of a link 58 which pivotally connects one end of the handle 50, as at 59, to the rod 42, as at 60. If desired, the handle may be held in any chosen position by means of an indexing button 61 which is carried by the plate 53 and is yieldably urged by means of a spring 62 into engagement with the walls of spaced openings 63 that are provided on the handle concentrically to the pivot 51, and in diametric opposition to the stations indicated at D, C, O, B, and A, respectively. The reference characters used for the control member 25 are the same, for like parts, as those used for number 24, except that the suffix "A" is employed wherever the characters are shown. Such designation applies except for the station markings on the plate 54A which are designated 1, 2, 0, 3, and 4, respectively.

For convenience of illustrating the various combinations of settings of the pistons members 20 and 21 for selective operation of engines by fuel from selective tanks, the appended tables show the connected engines and tanks corresponding to the various selected positions of the pilot control selectors 24 and 25, respectively. For ready reference the index quadrant of 24 is marked by setters A, B, O, C, D, for each selective position for gas control to the motors as fixed by registering pin 61, while the index quadrant 25 is marked by figures 1, 2, 0, 3, 4, for each selective position for gas control from the tanks. Thus, in Figs. 8 to 17, inclusive, assuming that the system is being used on a ship having two tanks and two engines, then the passageway for the conduit 15 is plugged so that the fuel is drawn only from two tanks. For such assembly, the various settings of the control indicators to secure operation of the engines are as follows:

| Fig. | Tanks and engines in operation | Setting for tank pilot 25 | Setting for engine pilot 24 |
|---|---|---|---|
| 8 | Both tanks shut off | 0 | O |
| 9 | Both tanks to both engines | 2 or 3 | B or C |
| 10 | Both tanks to left engine | 2 or 3 | D |
| 11 | Both tanks to right engine | 2 or 3 | A |
| 12 | Left tank to both engines | 1 | B or C |
| 13 | Left tank to left engine | 1 | D |
| 14 | Left tank to right engine | 1 | A |
| 15 | Right tank to both engines | 4 | B or C |
| 16 | Right tank to left engine | 4 | D |
| 17 | Right tank to right engine | 4 | A |

The foregoing table indicates that whenever the engine pilot setting is at O, both engines are shut off and that whenever the tank pilot setting is at 0 position, both tanks are cut off. It indicates further that both engines are operable whenever the pilot setting is at B or C, and that both tanks are operable whenever the setting is at 2 or 3. It further indicates that whenever the engine pilot is at position D, only the left engine is in operation, that when it is at position A, only the right engine is in operation, that when the tank setting is at position 1, only the left tank is in operation, and that when it is in position 4, only the right tank is in operation. The foregoing explanation of settings applies with equal force to unit "X" or "Y"; hence, with four-engines and four tanks in operation, as shown in Fig. 1, the conduit 15 is inter-connected between units "X" and "Y." In such instance, either or both tanks pertaining to each unit may be cut off while the conduit 15 remains open to receive fuel from the other tanks, or from any one of the other tanks, in accordance with the setting of the tank pilot. Thus, for example, in tank pilot position 0, both tanks associated with either unit are cut off, whereas conduit 15 is open. In position 1, one of the tanks of each unit is open and the other is off, while conduit 15 is open. In position 4 the other tank of each unit is open, while the first is off, and conduit 15 is open. In either position 2 or 3, both tanks and conduit 15 are open.

The foregoing explanation will show that in the operation of four engines from four tanks, any one or combination of tanks can be used for supplying any one or combination of engines, because the tank and engine control pilots are operable independently of each other. For the purpose of illustration, settings of the respective pilots under certain conditions of operation are illustrated in the following table:

| Tanks and engines in operation | Unit "X" | | Unit "Y" | |
|---|---|---|---|---|
| | Tank pilot 25 | Eng. pilot 24 | Tank pilot 25 | Eng. pilot 24 |
| All engines and tanks shut off | 0 | O | 0 | O |
| All tanks to all engines | 2 or 3 | B or C | 2 or 3 | B or C |
| All tanks to all engines, except 6 | 2 or 3 | D | 2 or 3 | B or C |
| All tanks to all engines, except 5 | 2 or 3 | A | 2 or 3 | B or C |
| All tanks, except 92, to all engines | 1 | B or C | 2 or 3 | B or C |
| All tanks, except 92, to all engines, except 5 | 1 | A | 2 or 3 | B or C |
| All tanks, except 92, to all engines, except 6 | 1 | D | 2 or 3 | B or C |
| All tanks, except 91, to all engines, except 5 | 4 | A | 2 or 3 | B or C |
| All tanks, except 91, to all engines, except 6 | 4 | D | 2 or 3 | B or C |
| Tanks 93 and 94, only, to engines 5 and 6 only | 0 | B or C | 2 or 3 | O |
| Tanks 93 and 94, only, to engine 5 only | 0 | D | 2 or 3 | O |
| Tanks 92, 93 and 94 to all engines | 4 | B or C | 2 or 3 | B or C |

The foregoing table shows that all tanks can be used for any individual or all engines, and that each individual tank can be used to service all or any individual engine. Fig. 18, for example, illustrates the valve positions for the use of all tanks for all engines. The system, however, is capable of additional flexibility in that should any tank be rendered incapable of use, the remaining tanks or combinations of them can be utilized for all or any combination of engines. For example, if tank 1 is rendered incapable of supplying fuel, then the remaining tanks can be utilized for servicing all or any individual engines. Thus, Fig. 19 shows the valve positions for the use of tanks 92, 93 and 94 for all engines. Similarly, if for any reason, more than one of the tanks should cease to function, then the valves may be set to shut off the fuel being supplied by any combination of tanks, and the engine settings may be positioned to operate either all, or any individual or combination of engines. It is necessary only to shift the member 20 for the desired engine selection and to shift the member 21 for the desired tank selection.

The control mechanism heretofore described utilizes hydraulic means for moving the valve members for controlling the flow of fuel from the respective tanks to the respective engines. If desired, however, I may utilize a mechanical device for moving the valve members. Thus, in Fig. 4, I have shown a unit designated M that has pistons 26B, 27B, 28B, and 29B which operate in a cylinder 65. Leading into the cylinder are passageways for attachment of fuel supply conduits 66 and 67, while leading from the cylinder is a passageway for attachment of a conduit 68 to an engine. In this case the unit is illustrated as adapted for use with a single engine having two sources of fuel supply.

To move the piston member shown in Fig. 4 through axially of its cylinder, I have shown the rod 69 as projecting through the cylinder walls 70 and 71, respectively, and as being connected at 72 and 73 to cables 74 and 75, respectively. Cable 74 is shown as passing around a guide pulley 76 and as having the free end thereof attached, as at 77, to a handle 50B, while the cable 75 is attached also to the handle at 78. The handle may be pivotally mounted at 79 to a plate 80 which in turn is supported on any rigid part of the structure in which the unit M is mounted. Suitable locating apertures 81 on the plate 80 function to permit setting of the valve member in any desired position by means of the indexing button illustrated, for example, in Fig. 3.

Figs. 20 to 23, inclusive, illustrate diagrammatically the position of the multiple piston slide member within a cylinder in a system wherein a plurality of liquid storage containers are utilized for supplying fuel to a single engine, and wherein the multi-piston slide member is movable to selected positions for enabling the engine to be cut off or to be supplied with fuel from any individual or all containers. Thus, for example, Fig. 20 shows the relative position of piston and ports in the "off" position; Fig. 21 shows the flow of fuel from one tank to the engine; Fig. 22 shows the flow of fuel from both tanks to the engine, and Fig. 23 shows the position for directing the flow of fuel from a tank different from that shown in Fig. 21 to the engine. In each instance, where only one tank is in operation, the valve is so positioned as to cut off the flow from the other tank.

To seal the various pistons as well as the passageways in the end walls 31, 32, 33 and 34 of the cylinders 16 and 17, I prefer to utilize a round flexible sealing member 83 shown in Fig. 5 within the piston grooves 84, or in the grooves 85 in the end walls. The depth of each groove is such that when the parts are assembled the ring is forced to assume an ellipsoidal shape, as shown in Fig. 7, but the width of the groove is greater than the longest dimension of the deformed ring, so as to permit slight movement of the ring back and forth in the groove as the piston rod is moved, whereby the material of which the ring is made may be kneaded and kept alive. Additionally, the width of each piston is less than that of any of the recesses in the cylinders whereby liquid may flow readily past the piston whenever it is positioned opposite a recess, as shown in the various diagrams. The ring-shaped packing material, however, provides automatically an effective seal whenever the piston is moved back into the cylinder.

The unit shown in Fig. 4 is capable of supplying fuel from both tanks or from either tank to the engine. For the purpose of illustration, the various stations at which the handle 50B may be positioned are indicated at R, S, T, U, and V. When the handle is in the position shown in Fig. 4, it is in the central position indicated at T, at which time both tanks are shut off. In the position indicated either at S or U, both tanks are connected to the engine, whereas in the position R, the tank connected to the conduit 67 is shut off, while that connected to conduit 66 is supplying fuel. On the other hand, when the handle is in the position V, the tank connected to the conduit 66 is shut off, and that connected to the conduit 67 is supplying fuel to the engine.

An important advantage of the present invention is the fact that the pilot can, independently of other members of his crew, quickly select any tank or engine, or combination of tanks or engines, as an emergency situation or operating condition may require. Additionally, by means of the present invention, the members for actuating the pilot valves can be located adjacent the operator no matter how remote the tanks or engines may be located from each other, or from the operator. The foregoing results are achieved by virtue of the sealing arrangement which enables the pistons to be moved back and forth within their respective cylinders, either to shut off or open the flow of fuel, without danger of leakage across any of the pistons.

I claim:

1. A fuel supply system for multi-engined aircraft comprising two fuel outlet means, a fuel reservoir associated with each of said outlet means, an individual conduit communicatively connecting each of said outlet means with its associated reservoir means, two valve bodies interposed in each of said conduits, and each valve body having a plurality of ports therein, one of the bodies having the ports thereof communicatively connected with the respective outlet means, and the other body having the ports thereof communicatively connected with the respective reservoir means, and each of said valve bodies being communicatively connected with each other, and each valve body having a positionable selector means therein for controlling the flow of fuel through said valve bodies and between said ports, whereby fuel may be delivered from any selected reservoir means to any selected outlet means.

2. A fuel supply system for multi-engined aircraft comprising a plurality of fuel outlet means, a fuel reservoir means associated with each of said outlet means, said outlet and reservoir means being arranged in groups of two to a group, and there being a plurality of said groups in the system, each group having a plurality of valve bodies that are communicatively interconnected and are interposed between the associated outlet and reservoir means, one of the valve bodies in each group having two ports therein communicatively connected with the associated respective outlet means, and the other valve body in each group having two ports therein respectively connected to the associated reservoir means and having a third port therein communicatively connected with the corresponding port in a valve body of another group, and each of the valve bodies of each group being communicatively connected to the other at all times, and each valve body having a positionable selector means therein, one of the means controlling the flow of fuel to the outlet means, and the other of said means controlling the flow of fuel from the reservoir means, whereby fuel may be delivered from any selected reservoir means in any group to any selected outlet means in any group.

3. A fuel supply system for multi-engined aircraft comprising four fuel outlet means, a fuel reservoir associated with each of said outlet means, said means being disposed in groups with two outlet means and two reservoir means to a single group, each group including two valve bodies that are communicatively interconnected, one of said bodies having two ports therein that are respectively communicatively connected to the outlet means, and the other of said bodies having three ports therein, two of which are respectively communicatively connected to the associated reservoir means, and the third of which is communicatively connected to a corresponding port in a corresponding valve body of the second group, and each body having a positionable selector means therein, one of said means operating to control the flow of fuel to the outlet means of the associated group, and the other of said means operating to control the flow of fuel thereinto from any of said reservoir means, whereby fuel may be delivered from any selected reservoir means to any selected outlet means.

4. A fuel supply system for multi-engined aircraft comprising two fuel outlet means, and at least three fuel reservoir means, a multi-port valve body having one port communicatively connected with one of the outlet means, and having a second port communicatively connected with the other outlet means, a second multi-port body having one port communicatively connected with one reservoir means, a second port communicatively connected with a second reservoir means, and a third port communicatively connected with a third reservoir means, means for establishing communication between the valve bodies, and each body having a positionable selector means therein for controlling the flow of fuel through said bodies between said ports, whereby fuel may be delivered from any selected reservoir to any selected outlet means.

5. A fuel supply system for multi-engined aircraft comprising a plurality of units of fuel outlet means, a fuel reservoir means associated with each of said outlet means, there being at least two outlet means in each of said units, two valves interposed between the outlet means of each group and the associated reservoir means, each valve comprising a multi-port valve body communicatively interconnected adjacent the mid-portions thereof, one of the valve bodies of each unit having two ports therein communicatively connected respectively to the associated outlet means, the other of said valves of each unit comprising a multi-port valve body having three ports therein, two of which are communicatively connected to the associated reservoir means, and a cross feed conduit communicatively connected to the third ports of said last-named valve bodies, and each valve having a selectively settable control member for enabling fuel to be delivered from any selected reservoir means to any selected outlet means.

NIELS A. CHRISTENSEN.